United States Patent
Qiu et al.

(10) Patent No.: US 9,092,338 B1
(45) Date of Patent: Jul. 28, 2015

(54) MULTI-LEVEL CACHING EVENT LOOKUP

(71) Applicant: Google Inc., Mountain View, CA (US)

(72) Inventors: Tianhao Qiu, Cupertino, CA (US);
Manpreet Singh, Santa Clara, CA (US);
Haifeng Jiang, Sunnyvale, CA (US);
Ashish Gupta, Sunnyvale, CA (US);
Sumit Das, Sunnyvale, CA (US);
Venkatesh Basker, Mountain View, CA (US); Rajagopal Ananthanarayanan, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/038,110

(22) Filed: Sep. 26, 2013

Related U.S. Application Data

(60) Provisional application No. 61/803,632, filed on Mar. 20, 2013.

(51) Int. Cl.
| | |
|---|---|
| *G06F 13/38* | (2006.01) |
| *G06F 17/30* | (2006.01) |
| *G06F 12/08* | (2006.01) |
| *G06F 12/12* | (2006.01) |

(52) U.S. Cl.
CPC .......... *G06F 12/0811* (2013.01); *G06F 12/122* (2013.01)

(58) Field of Classification Search
None
See application file for complete search history.

(56) References Cited

U.S. PATENT DOCUMENTS

| | | | |
|---|---|---|---|
| 6,167,432 A | | 12/2000 | Jiang |
| 6,477,619 B1 * | | 11/2002 | Fujimoto et al. ............... 711/114 |
| 7,840,547 B1 * | | 11/2010 | Tucker et al. ................. 707/706 |
| 8,370,520 B2 * | | 2/2013 | Kohli et al. .................... 709/233 |
| 8,626,136 B2 * | | 1/2014 | Ozzie et al. ................ 455/414.2 |
| 2003/0204474 A1 | | 10/2003 | Capek et al. |
| 2006/0242017 A1 | | 10/2006 | Libes et al. |
| 2007/0150450 A1 * | | 6/2007 | Murase ............................ 707/3 |
| 2011/0040887 A1 | | 2/2011 | Andrade et al. |
| 2011/0173235 A1 | | 7/2011 | Aman et al. |
| 2011/0231241 A1 | | 9/2011 | Kesari et al. |
| 2011/0288928 A1 | | 11/2011 | Patwa et al. |
| 2012/0010979 A1 | | 1/2012 | Ramer et al. |
| 2012/0151253 A1 | | 6/2012 | Horn |
| 2012/0191982 A1 * | | 7/2012 | Levin ............................ 713/189 |

(Continued)

OTHER PUBLICATIONS

Abadi, Daniel J. et al., "The Design of the Borealis Stream Processing Engine," Proceedings of the 2005 CIDR Conference.

(Continued)

*Primary Examiner* — Michael Sun
(74) *Attorney, Agent, or Firm* — Lerner, David, Littenberg, Krumholz & Mentlik, LLP

(57) ABSTRACT

Aspects of the disclosure relate generally to a distributed event joining system for joining primary and secondary events based on a common key. In one example, a continuous stream of primary events may be submitted by a plurality of ad serving computers for storage at a cache layer. Each primary event may be associated with a primary event key. After a time T, the stream of primary events may be sent to long term memory. The system may also receive secondary events, each associated with a primary key. The primary key may be used to identify a primary event in the cache layer. If the primary event is not available in the cache layer, the long term memory may be searched for the primary key. Paired events may then be submitted to a distributed joined event storage system.

20 Claims, 4 Drawing Sheets

(56) References Cited

U.S. PATENT DOCUMENTS

2013/0066880 A1* 3/2013 Schramm et al. ............. 707/743
2014/0324816 A1* 10/2014 Bennett et al. ................ 707/709

OTHER PUBLICATIONS

Das, Abhinandan et al., "Approximate Join Processing Over Data Streams," SIGMOD (2003) ACM 1-58113-634.
Baker Jason et al., "Megastore: Providing Scalable, Highly Available Storage for Interactive Services," 5th Biennial Conference on Innovative Data Systems Research (2011) Asilomar, California USA.
Codd, E.F. et al., "A Relational Model of Data for Large Shared Data Banks," Communications of the ACM, (1970) 13:6.
Corbett, James C. et al., "Spanner: Google's Globally-Distributed Database," 10th USENIX Symposium on Operating Systems Design and Implementation (2012).
Dean, Jeffrey et al., "MapReduce: Simplified Data Processing on Large Clusters," OSDI Technical Program (2004) pp. 1-13.
Fitzpatrick, Brad, "Distributed Caching with Memcached," Linux Journal (2004) www.linuxjournal.com/node/7451/print.
Gedik, Bugra, et al., "Executing Stream Joins on the Cell Processor," VLDB (2007) ACM 978-1-59593-649, Vienna Austria.
Ghemawat, Sanjay et al., "The Google File System," SOSP (2003) ACM 1-58113-757.
Hammad Moustafa A. et al., "Stream Window Join: Tracking Moving Objects in Sensor-Network Databases," SSDBM (2003).
Kang, Jaewoo et al., "Evaluating Window Joins over Unbounded Streams," Proceedings of the 28th VLDB Conference, (2002) Hong Kong, China.
Karger, David et al.,"Consistent Hashing and Random Trees: Distributed Caching Protocols for Relieving Hot Spots on the World Wide Web," Department of Mathematics, MIT, Cambridge (1997) http://theory.lcs.mit.edu.
Mishra, Priti et al., "Join Processing in Relational Databases," ACM Computing Surveys, (1992) 24:1.
Neumeyer, Leonardo et al., "S4: Distributed Stream Computing Platform," IEEE International Conference on Data Mining Workshops, (2010) 978-0-7695-4257.
Rao, Jun et al., "Using Paxos to Build a Scalable, Consistent, and Highly Available Datastore," VLDB Endowment (2011) 4:4.
Schneider, Fred B., "Implementing Fault-Tolerant Services Using the State Machine Approach: A Tutorial," ACM Computing Surveys, (1990) 22:4.
Chandrasekaran, Sirish et al., "Streaming Queries over Streaming Data," Proceedings of the 28th VLDB Conference, (2002) Hong Kong, China.
Teubner, Jens et al., "How Soccer Players Would do Stream Joins," SIGMOD (2011) Athens, Greece.
What is Amazon DynamoDB?—Amazon DynamoDB (2013) docs.aws.amazon.com/amazondynamodb/latest/developerguide/Introduction.html.
Xie, Junyi et al., "A Survey of Join Processing in Data Streams," (2006).
Chang, Fay et al., "Bigtable: A Distributed Storage System for Structured Data," ACM Transactions on Computer Systems (2008) 26:2 Article 4.
Zaharia, Matei et al., "Discretized Streams: A Fault-Tolerant Model for Scalable Stream Processing," Electrical Engineering and Computer Sciences University of California at Berkeley (2012) http://www.eecs.berkeley.edu/Pubs/TechRpts/2012/EECS-2012-259.html.
Xie, Junyi et al., "A Survey of Join Processing in Data Streams," (2007).
Shasa, Dennis et al., "Database Tuning: Principles, Experiments, and Troubleshooting Techniques," Morgan Kaufmann Publishers (2002) ISBN: 1558607536.
Kang, Jaewoo et al., "Evaluating Window Joins Over Unbounded Streams", University of Wisconsin-Madison, Computer Sciences Department, 2003, 12 pages.
ATG Installation and Configuration Guide, [online], [Retrieved Mar. 7, 2013] Retrieved from the Internet: <http://docs.oracle.com/cd/E23095_01/Platform.93/ATGInstallGuide/html/s08> 1 page.
Leslie Lamport, Paxos Made Simple, Nov. 1, 2001, 14 pages.
Spyros Blanas, Jignesh M. Patel, Vuk Ercegovac, Jun Rao, Eugene J. Shekita and Yuanyuan Tian, A Comparison of Join Algorithms for Log Processing in MapReduce, 12 pages, 2010.
Spyros Blanas, Jignesh M. Patel, Vuk Ercegovac, Jun Rao, Eugene J. Shekita and Yuanyuan Tian, A Comparison of Join Algorithms for Log Processing in MapReduce, Power Point Presentation, 17 pages, 2010.
Tushar Chandra, Robert Griesemer, and Joshua Redstone, Paxos Made Live—An Engineering Perspective, Jun. 26, 2007, 16 pages.

* cited by examiner

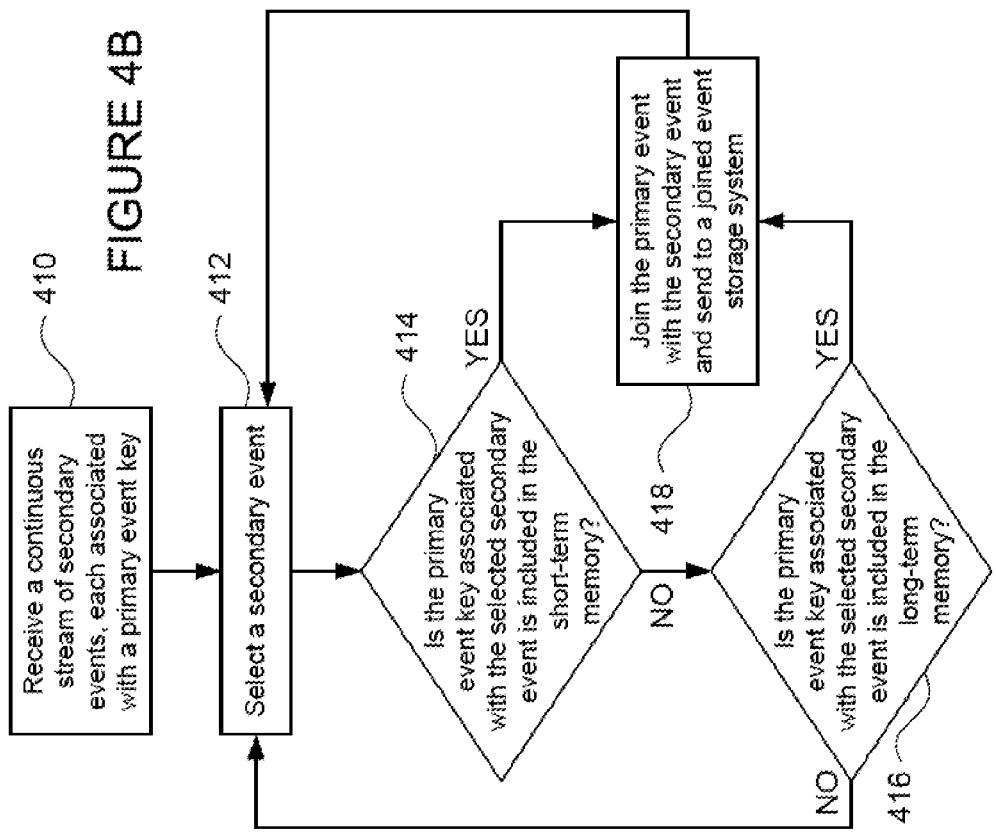
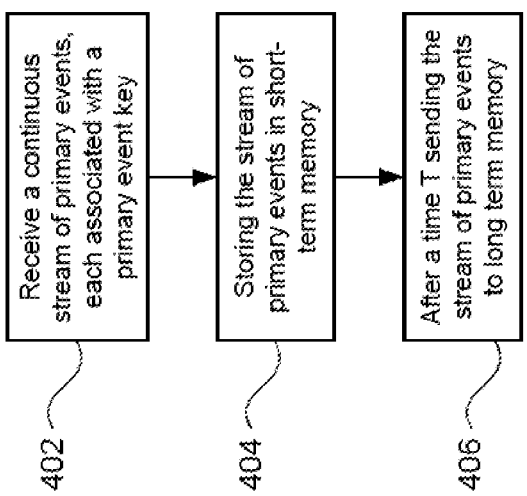

MULTI-LEVEL CACHING EVENT LOOKUP

CROSS REFERENCE TO RELATED APPLICATIONS

The present application claims the benefit of the filing date of U.S. Provisional Patent Application No. 61/803,632 filed Mar. 20, 2013, the entire disclosure of which is hereby incorporated herein by reference.

BACKGROUND

Log joining systems may attempt to join one source of secondary events with another source of primary events. In one example, primary events may include search queries, while secondary events may include user clicks on advertisements. Every primary event is uniquely identified by a key, and every secondary event is associated with a key for a corresponding primary event. The purpose of log joining is to locate the corresponding primary event for every secondary event based on the primary key.

To be able to lookup corresponding event from event stream effectively, having a very low-latency during look ups is very important. It becomes much more important and critical for a continuous joining system where the primary events and secondary events are received continuously. The systems described above may only be able to lookup within an interval window of events, and the complexity of these systems may increase multi-fold as the interval increases. Thus, such a configuration may not scale well in a larger system having a continuous stream of events.

SUMMARY

One aspect of the disclosure provides a method. The method includes receiving, from an ad serving computer, a request to write a file to a cache layer. The file includes event information for a series of events. The event information for each particular event of the series is associated with (1) a primary event key for the particular event and (2) a timestamp. The event information of the series is in timestamp order in the file. The method also includes writing, by a processor, the event information from the file to the cache layer by processing the event information of the last event in the series before any other event information in the file and receiving a request to lookup a particular primary key in the cache layer.

In one example, writing the event information includes first overwriting event information associated with an oldest timestamp in the cache memory. In another example, the method also includes, once event information is to be overwritten, sending the event information that is to be overwritten to long term storage.

Another aspect of the disclosure provides a system. The system includes a cache memory storage layer for short term storage and a processor. The processor is configured to receive a request to write a file to the cache memory storage layer. The file includes event information for a series of events. The event information for each particular event of the series is associated with (1) a primary event key for the particular event and (2) a timestamp. The event information of the series is in timestamp order in the file. The processor is also configured to store the event information from the file to the cache layer by processing the event information of the last event in the series before any other event information in the file and receive a request to lookup a particular primary key in the cache memory storage layer.

In one example, writing the event information includes first overwriting event information associated with an oldest timestamp in the cache memory. In another example, the processor is also configured to, once event information is to be overwritten, send the event information that is to be overwritten to long term storage.

A further aspect of the disclosure provides a non-transitory, tangible computer-readable storage medium on which computer readable instructions of a program are stored. The instructions, when executed by a processor, cause the processor to perform a method. The method includes receiving, from an ad serving computer, a request to write a file to a cache layer, the file including event information for a series of events. The event information for each particular event of the series is associated with (1) a primary event key for the particular event and (2) a timestamp. The event information of the series is in timestamp order in the file. The method also includes writing the event information from the file to the cache layer by processing the event information of the last event in the series before any other event information in the file, and receiving a request to lookup a particular primary key in the cache layer.

In one example, writing the event information includes first overwriting event information associated with an oldest timestamp in the cache memory. In another example, once event information is to be overwritten, sending the event information that is to be overwritten to long term storage.

BRIEF DESCRIPTION OF THE DRAWINGS

FIGS. 4A and 4B are example flow diagrams in accordance with aspects of the disclosure.

DETAILED DESCRIPTION

Aspects of the disclosure relate generally to a distributed event joining system for joining primary and secondary events based on a common key. As an example, a continuous stream of primary events may be received directly from an ad serving computer. Each primary event may be associated with a primary event key. The stream of primary events may stored in short-term memory. After a predetermined period of time, the stream of primary events is sent to long term memory. This process may repeat continuously as new primary events are received from the continuous stream of primary events.

A continuous stream of secondary events, each associated with a primary event key, may also be received. A secondary event may be selected. Next, whether the primary event key associated with the selected secondary event is included in the short-term memory may be determined. This may be repeated several times. If the primary event key is included in the short-term memory, the primary event may be joined with the secondary event and set to a joined event storage system, and another secondary event may be selected.

If the primary event key is not included in the short-term memory, whether the primary event key associated with the selected secondary event is included in the long-term memory may be determined. Again, this may be repeated several times. If the primary event key is included in the long-term memory, the primary event may be joined with the secondary event and sent to a joined event storage system. If the primary event key is not included in the long-term memory, the pairing may fail, and another secondary event may be selected. Again, this process may repeat continuously as new primary events are received from the continuous stream of primary events.

Figure 1:
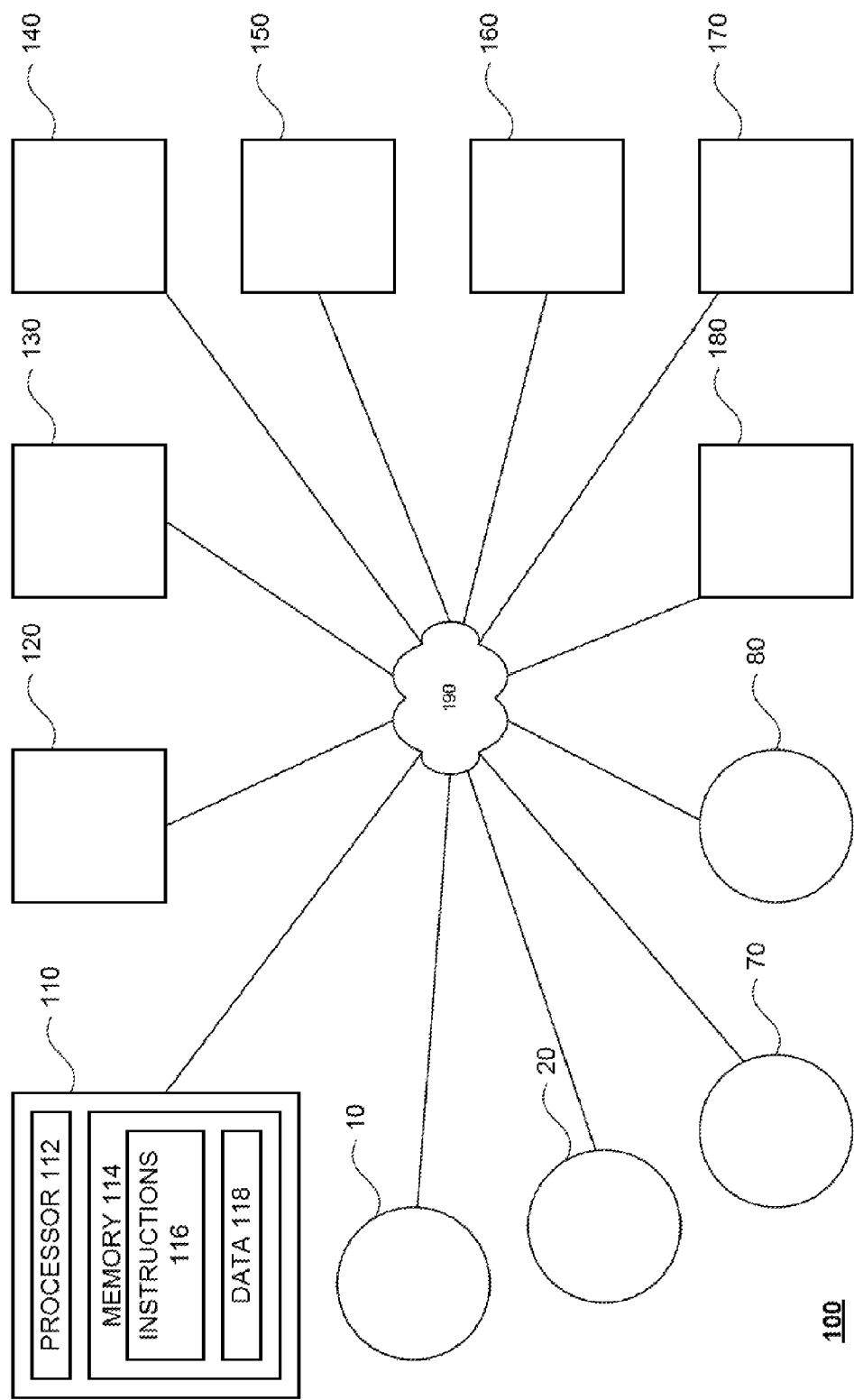
FIG. 1 is a functional diagram of a system in accordance with aspects of the disclosure.
Figure 2:
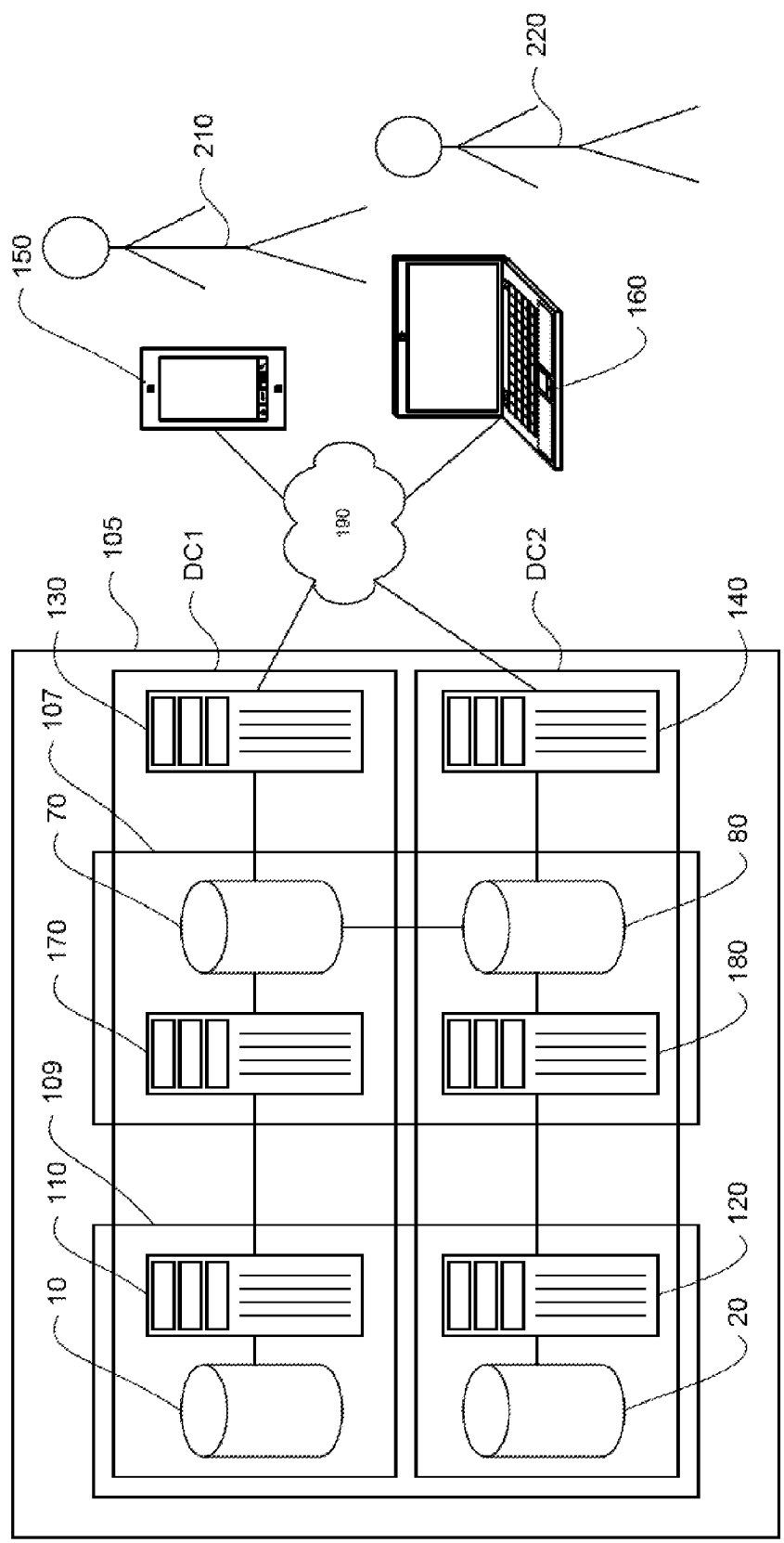
FIG. 2 is a pictorial diagram of the system of FIG. 1.

FIGS. 1-2, depict a system 100, which is used herein as an example system in which the event joiner system described herein may be implemented. It should not be considered as limiting the scope of the disclosure or the usefulness of the features described herein. In this example, system 100 can include computers 110, 120, 130, 140, 150, 160, 170, and 180 and databases 10, 20, 70, and 80. Computers 110 and 120 can contain a processor 112, memory 114 and other components typically present in general purpose computers. Memory 114 of computer 110 can store information accessible by processor 112, including instructions 116 that can be executed by the processor 112.

Memory can also include data 118 that can be retrieved, manipulated or stored by the processor. The memory can be of any type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computer-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processor 112 can be any conventional processor, such as commercially available CPUs. Alternatively, the processor can be a dedicated device such as an ASIC or other hardware-based processor. Although FIG. 1 functionally illustrates the processor, memory, and other elements of computer 110 as being within the same block, the processor, computer, or memory can actually comprise multiple processors, computers, or memories that can or cannot be stored within the same physical housing. For example, memory can be a hard drive or other storage media located in a housing different from that of computer 110. Accordingly, references to a processor, computer, or memory will be understood to include references to a collection of processors, computers, or memories that can or cannot operate in parallel.

The computer 110 can be at one node of a network 190 and capable of directly and indirectly communicating with other nodes, such as computers 130, 150, 160, 170 as well as databases 10 and 70, of the network. Similarly, computer 120 can be at another node of the network and capable of directly and indirectly communicating with other nodes, such as computers 140, 150, 160, and 180 as well as databases 20 and 80.

The network 190 and intervening nodes described herein, can be interconnected using various protocols and systems, such that each can be part of the Internet, World Wide Web, specific intranets, wide area networks, or local networks. These can use standard communications protocols or those proprietary to one or more companies, Ethernet, WiFi and HTTP, and various combinations of the foregoing.

Each of computers 120, 130, 140, 150, 160, 170, 180 can be configured similarly to the computer 110, with a processor, memory, instructions, and data, similar to processor 112, memory 114, instructions 116, and data 118. As an example, computers 110 and 120 may be key registry servers, computers 170 and 180 may be worker computers, computers 130 and 140 may be web servers, and computers 150 and 160 may be client devices. As such, key registry server 110, worker computer 170, web server 130, and databases 10 and 70 may operate at a first data center DC1 (shown in FIG. 2) at a first geographic location, while key registry server 120, worker computer 180, web server 140, and databases 20 and 80 may operate at a second data center DC2 (shown in FIG. 2) at a second geographic location remote from the first geographic location of the first data center. In this regard, the first and second datacenters may be considered a geographically distributed computing system 105 (shown in FIG. 2). Although not shown, the computing system many more datacenters.

Although FIGS. 1 and 2 depict key registry servers 110 and 120 and worker computers 170 and 180 as singular devices, these devices may each represent many key registry servers or worker computers. Similarly, web servers 130 and 140 may also comprise many computers, e.g., a load balanced server farm, that exchange information with different nodes of network 190 for the purpose of receiving, processing and transmitting data to the client devices 150 and 160. In this instance, the client devices will typically still be at different nodes of the network than any of the computers of servers 110, 120, 130 or 140 or worker computers 170 or 180.

Each client device 150 and 160 can be a personal computer, intended for use by a user 210 or 220, having all the components normally found in a personal computer such as a central processing unit (CPU), display device, CD-ROM, hard drive, user inputs, speakers, modem and/or network interface device, and all of the components used for connecting these elements to one another. Moreover, client devices in accordance with the systems and methods described herein can comprise any device capable of processing instructions and transmitting data to and from humans and other computers including general purpose personal computers, PDAs, network computers lacking local storage capability, set-top boxes for televisions, wireless-enabled PDA, hand-held or in-car navigation device, tablet PC, netbook, a cellular phone capable of obtaining information using the Internet, and other networked devices.

As described in more detail below, databases 70 and 80 may store logs of event information reported by web servers 130 and 140. The logs may include input from continuous data streams including a primary data stream of primary keys or primary event identifiers, timestamps, and other associated information. This log data may be accessed by worker computers 170 and 180 arranged as a distributed event joining system 107 of FIG. 2.

Figure 3:
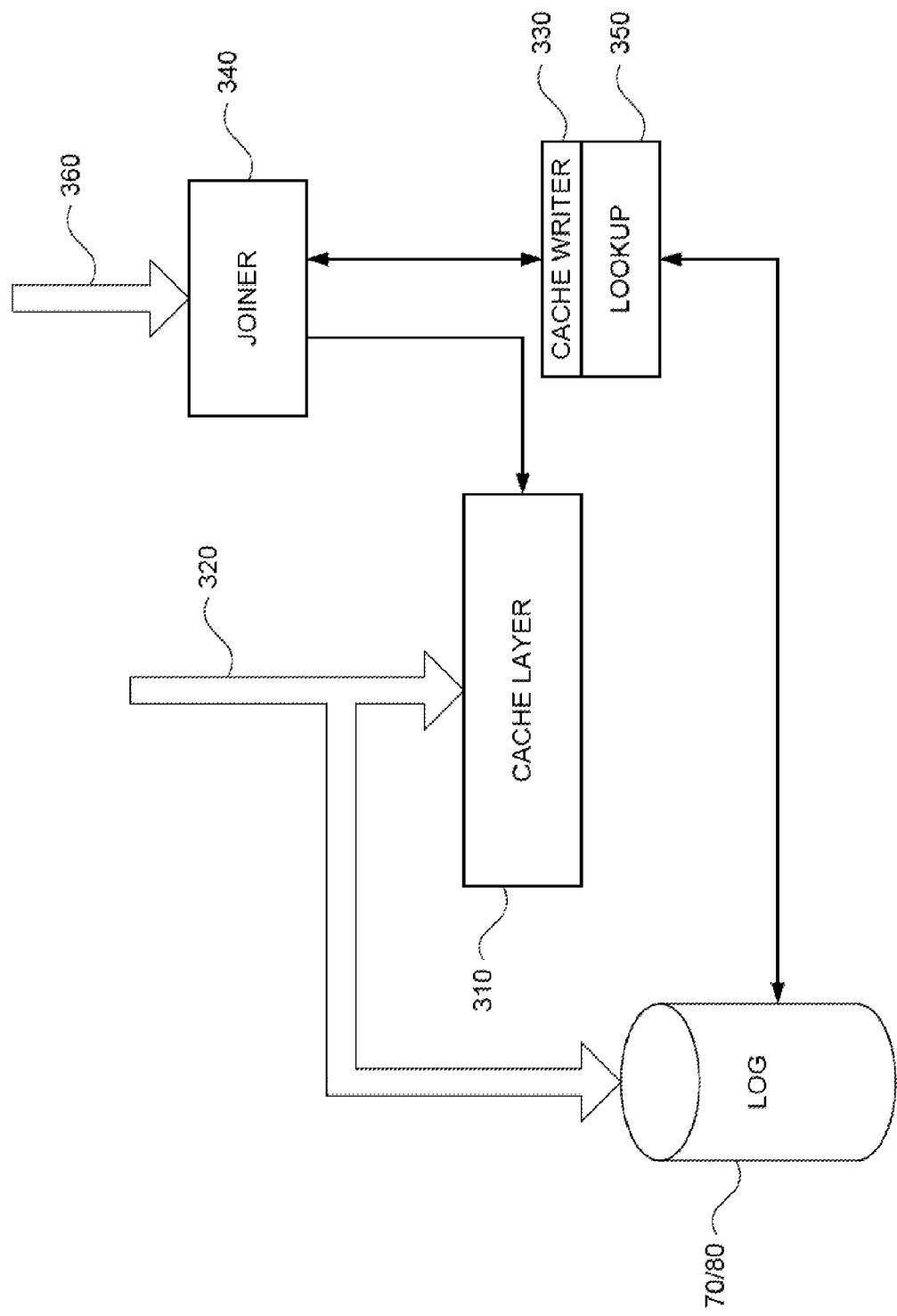
FIG. 3 is an example diagram of an event joining system in accordance with aspects of the disclosure.

An example of a configuration for the distributed joining system 107 is shown in more detail in FIG. 3. In this example, the joining system may further include a cache layer 310 for the primary event stream 320. The cache layer may be configured as one or more cache server computer, again configured similarly to computer 110, with a processor and memory storing instructions and data similar to processor 112, memory 114, instructions 116, and data 118. The cache layer 310 may store primary event information 320 as described in more detail below.

In this example, the instructions of worker computers 170 and 180 may include a cache writer 330, a joiner tool 340 and a lookup tool 350. As described in more detail below, the cache writer 330 may be used to write event information to the cache layer. The joiner tool may be used to join primary and secondary events by common keys, here, event IDs. The lookup tool may be used to query the databases 70 and 80 for primary keys.

Databases 10 and 20 may include logs that store joined keys or event IDs. The logs may include primary keys or primary events IDs that have been paired with secondary keys or secondary event IDs. These logs may be managed by the key registry servers 110 and 120 as a distributed joined event storage system, such as system 109 of FIG. 2.

Although certain advantages are obtained when information is transmitted or received as noted above, other aspects of the subject matter described herein are not limited to any particular manner of transmission of information. For example, in some aspects, information can be sent using a medium such as a disk, tape or CD-ROM. Yet further, although some functions are indicated as taking place on a single computer having a single processor, various aspects of the subject matter described herein can be implemented by a multiple of computers, for example, communicating information over network 190.

In addition to the operations described below and illustrated in the figures, various operations will now be described. It should also be understood that the following operations do not have to be performed in the precise order described below. Rather, various steps can be handled in a different order or simultaneously. Steps can also be omitted unless otherwise stated.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server, such as web servers 130 or 140.

As an example of the operation aspects of system 100, when a client device, such as client device 150, submits a search query to web server 130, web server 130 may respond to the request by providing information such as a web page and one or more advertisements for display to the user 210. This query may be considered an event. Web server 130 may also generate a key, for example here an event identifier (event ID). In this example, the query event may be considered a primary event, and the event ID a primary event identifier (primary event ID). The primary event ID may be a query identifier (query ID) for the query. The web server 130 may also send the event information to the distributed event joiner system 107. For each advertisement, the primary event information may include the query ID, a timestamp, an advertiser identifier, auction data for the advertisement, etc.

After receiving the web page and advertisements, user 210 may click on one of the advertisements. The click may be considered a secondary event. The click event may be sent to web server 130 which may direct the client device to the advertiser's web site. The click event may also be given a key or event ID. In this example, the event ID would be a secondary event identifier (secondary event ID) and may be a click identifier (click ID). The click ID may be associated with the corresponding query ID as well as other information used to bill the advertiser as secondary event information. The secondary event information may also be sent to the distributed event joiner system 107.

In this example, all click events are always secondary to query events, and may typically occur within an hour of one another. Also note that, this observation is not just limited to click and query but also applicable to many other practical events such as an online trading platform which needs to join the transaction logs with client request logs. Based on this observation, the present disclosure provides a best-effort super efficient in-memory cache layer on top of robust event lookup system that can retrieve an event from disk (log files). The cache layer is meant to serve all recent primary events, and in many practical cases, it can serve up to 90% of lookups.

Although the present disclosure relates to click and query event streams, such systems may be used to join many different types of event streams. For example, some advertisement serving systems may provide advertisements and results as a user is typing a query, by making assumptions about what the user is searching for rather than waiting for a specific search request from the user. Thus, it may be necessary to join the user's actions, such as clicking on an advertisement with the corresponding query for which the system assumed was being searched.

Again, FIG. 3 is an example of a configuration for the distributed joining system 107. In this example, primary event information 320 and secondary event information 360 may be received as input to the distributed event joiner system. The event information may be received approximately in the timestamp order in continuous streams 320 and 360. The number of primary events may be much greater than the number of secondary events. For example, for every advertisement shown, only a portion may actually be associated with a click event. In addition, a majority of joining requests from the secondary stream may be looking for recent events in the primary stream.

As shown in FIG. 3, primary event information 320 may be directly streamed into the cache layer 310. As noted above, the cache layer may store primary event information for up to an amount of time T based on the timestamp associated with each primary event. After T time has passed, primary event information may be may be moved (copied and overwritten) to the databases 70 and 80 on a first in, first out basis. The value of T may be a relatively short amount of time, such as a few minutes, or significantly longer such as an hour or more.

The distributed event joiner system may use the Cache layer for the majority of recent event look ups. However, to achieve this, it becomes important to populate the cache server as effectively and efficiently as possible.

In one example, the system 107 may use a direct remote procedure call (RPC) approach. In such an example, the generator of the primary event information may directly record the query in the cache layer. Thus, it may not be necessary, and it may even be faster, to first store the information at some other storage device.

For example, once an advertisement has been served, the event information generated by web servers 130 or 140 may be sent directly to the cache layer 107 with an RPC to record the event information. To further increase the efficiency of the system, such requests may be sent asynchronously as the event information is generated. In addition, the web servers 130 or 140 need not wait for a confirmation from the cache layer, but may simply continue to send RPCs to write new event information as it is generated.

In addition or alternatively to the direct RPC approach, the distributed event joiner system 107 may utilize a file-tailing pipeline. In many scenarios, it may not be easy to integrate multiple joining systems to a single serving system such as the distributed event joiner system 107. In those scenarios, it may be much more effective to utilize a cache writer 330 that continuously tails query log files for new events and populates the cache.

In one example, the cache writer 330 may read all of the input files sequentially as they are received, as opposed to disk-based lookups with random seeks. This may reduce the load on the cache layer multi-fold. For example, as noted above all events may have a timestamp and these events may be submitted to the cache layer in a file sorted by timestamp. This may also for simple first in first out based cache clearance.

Because the cache layer tries to take away the load from disk-based lookup systems for recent events, it becomes much less useful if the cache writer falls behind writing new events to the cache layer. This may occur if the cache-writer is slow on populating the cache layer. Accordingly, more recent events may be given more priority over older ones. Thus, if the cache writer falls behind, it may begin writing recent events before processing older events. In other words, the cache writer may try to write events towards the end of the RPC before the pending bytes in the middle of a file. For example, if the cache writer 330 is behind and receives instructions to write a series of events, E1, E2, . . . En, and the corresponding primary event information, the cache writer may copy the event information from En before En−1, etc.

As noted above, the oldest primary event information in the cache layer is sent to the logs. Eventually, all of the primary event information received by the distributed joiner system 107 is stored at the logs of databases 70 and 80.

As secondary information is received by the joiner tool 340, it may be examined to identify a primary key. The primary key may then be used to determine whether the primary event is stored in the cache layer. If so, the primary event associated with the primary event information may be joined with the secondary event information.

When a key does not exist in the cache layer 107, the joiner tool 340 may use the lookup tool 350 to query the log data of databases 70 and 80. In this regard, the logs databases 70 and 80, may play the role of a catch-all. Thus, older primary event information may still be available for pairing until it reaches an expiration date T2 past which a pairing with a secondary event would be unlikely, for example a few days. The lookup tool may have to perform multiple disk reads of databases 70 or 80 to find an event as they system may seek and read at multiple disk offsets and the final event may need sequential reads. For example, if a key is not found, then the system may retry after some duration based on T2. However, this may be cheaper than cache-layer lookups, which can be costly in terms of RAM, but may have higher latency and processing loads.

FIGS. 4A and 4B are example flow diagrams for a distributed event joining system including some of the features described above. For example, FIG. 4A is an example flow diagram for the processes that may occur at cache layer 310. First, a continuous stream of primary events is received directly from an ad serving computer at block 402. Each primary event is associated with a primary event key. The stream of primary events is stored in short-term memory at block 404. After a time T, the stream of primary events is sent to long term memory. The blocks of FIG. 4A may repeat continuously as new primary events are received from the continuous stream of primary events.

In the example of FIG. 4B, is an example flow diagram for the processes that may be performed by the worker computers. A continuous stream of secondary events, each associated with a primary event key, is received at block 410. A secondary event is selected at block 412. Next, whether the primary event key associated with the selected secondary event is included in the short-term memory is determined at block 414. This block may be repeated several times before progressing to the next block. If the primary event key is included in the short-term memory, the primary event is joined with the secondary event and set to a joined event storage system at block 414, and another secondary event is selected at block 412.

If the primary event key is not included in the short-term memory, whether the primary event key associated with the selected secondary event is included in the long-term memory is determined at block 416. Again, this block may be repeated several times before progressing to the next block. If the primary event key is included in the long-term memory, the primary event is joined with the secondary event and sent to a joined event storage system at block 414. If the primary event key is not included in the long-term memory, the pairing may fail, and another secondary event is selected at block 412. Again, the blocks of FIG. 4B may repeat continuously as new primary events are received from the continuous stream of primary events.

As noted above, the cache layer 310 takes away the majority of recent event lookups from the logs making the whole distributed event joining system much more scalable. This is because the cache layer 310 has relatively low latency and relatively low disk-load. As a result of this, the system 107 can even retry looking up a key in the cache layer multiple times before giving up and going to disk-based lookup system (for example, at databases 70 or 80). This multiple reply may be cheaper in terms of latency and processing loads than the cost of disk seeks on the databases. It may also provide some extra time for the cache layer 310 to catch up as new secondary event information is received.

Because the cache layer handles the majority of recent event lookups, this may add up to a tremendous savings in processing power, and thus, make the system scalable. For example, in a joining system for query and click events, if the cache layer is configured to store primary event information for up to an hour, this may lead to up to 90% of lookups being addressed at the cache layer.

However, looking up specific keys directly from the disk requires a significant amount of effort, especially as in the system 105 where some of the logs may be located in distant datacenters. This may also add to network costs. Therefore, the more the system may rely on the cache layer 107 for looking up keys, the greater the overall savings to the network as well.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    receiving, from an ad serving computer, a request to write a file to cache memory, the file including event information for a series of search queries submitted by one or more users, wherein the event information for each search query of the series is associated with (1) a primary event key identifying a particular search query of the series of search queries and (2) a timestamp for when the particular search query was submitted, and wherein the event information of the series is in timestamp order in the file;
    determining whether one or more processors are falling behind in writing event information to the cache memory in timestamp order such that search queries with older timestamps are written before search queries with newer timestamps;
    when the one or more processors are falling behind in writing event information to the cache memory in timestamp order, writing, by the one or more processors, the event information from the file to the cache memory by processing the event information of a most recent search query in the series of search queries before any other event information in the file; and
    receiving a request to lookup a particular primary key in the cache memory.

2. The method of claim 1, wherein writing the event information includes first overwriting oldest event information associated with an oldest timestamp in the cache memory before overwriting other event information in the cache memory.

3. The method of claim 2, further comprising, when the oldest event information is to be overwritten, sending the oldest event information to long term storage.

4. The method of claim 1, further comprising:
    determining whether the particular key is included in the cache memory; and
    when the particular key is included in the cache memory, joining a secondary event corresponding to a user selecting an advertisement with the search query identified by the particular key.

5. The method of claim 1, further comprising:
    determining whether the particular key is included in the cache memory; and
    when the particular key is not included in the cache memory, determining whether the particular key is included in long term storage.

6. The method of claim 5, further comprising:
    when the particular key is not included in the long term memory, waiting a predetermined period of time related to an amount of time a key is stored in the long term storage; and
    after the predetermined period of time has passed, determining again whether the particular key is included in the long term storage.

7. The method of claim 1, further comprising when given event information has been stored in the cache memory for more than a second predetermined period of time, sending the given event information to the long term storage, wherein the predetermined period of time is greater than the second predetermined period of time.

8. A system comprising:
    cache memory for short term storage;
    one or more processors configured to:
        receive a request to write a file to the cache memory storage memory, the file including event information for a series of search queries submitted by one or more users, wherein the event information for each search query of the series is associated with (1) a primary event key identifying a particular search query of the series of search queries and (2) a timestamp for when the particular search query was submitted, and wherein the event information of the series of search queries is in timestamp order in the file;
        determine whether the one or more processors are falling behind in writing event information to the cache memory in timestamp order such that search queries with older timestamps are written before search queries with newer timestamps;
        when the one or more processors are falling behind in writing event information to the cache memory in timestamp order, writing the event information from the file to the cache memory by processing the event information of a most recent search query in the series of search queries before any other event information in the file; and
        receive a request to lookup a particular primary key in the cache memory storage memory.

9. The system of claim 8, wherein
writing the event information includes first overwriting oldest event information associated with an oldest timestamp in the cache memory before overwriting other event information in the cache memory.

10. The system of claim 9, wherein
the one or more processors are further configured to, when the oldest event information is to be overwritten, send the oldest event information that is to be overwritten to long term storage.

11. The system of claim 8, wherein the one or more processors are further configured to:
    determine whether the particular key is included in the cache memory; and
    when the particular key is included in the cache memory, joining a secondary event corresponding to a user selecting an advertisement with the search query identified by the particular key.

12. The system of claim 8, wherein the one or more processors are further configured to:
    determine whether the particular key is included in the cache memory; and
    when the particular key is not included in the cache memory, determine whether the particular key is included in long term storage.

13. The system of claim 8, wherein the one or more processors are further configured to:
    when the particular key is not included in the long term memory, wait a predetermined period of time related to an amount of time a key is stored in the long term storage; and
    after the predetermined period of time has passed, determine again whether the particular key is included in the long term storage.

14. The system of claim 13, wherein the one or more processors are further configured to, when given event information has been stored in the cache memory for more than a second predetermined period of time, send the given event information to the long term storage, wherein the predetermined period of time is greater than the second predetermined period of time.

15. The system of claim 14, further comprising the long term storage.

16. A non-transitory, tangible computer-readable storage medium on which computer readable instructions of a program are stored, the instructions, when executed by one or more processors, cause the one or more processors to perform a method, the method comprising:
    receiving, from an ad serving computer, a request to write a file to a cache memory, the file including event information for a series of search queries submitted by one or more users, wherein the event information for each particular search query of the series is associated with (1) a primary event key identifying a particular search query of the series of search query and (2) a timestamp for when the particular search query was entered, and wherein the event information of the series is in timestamp order in the file;
    determining whether the one or more processors are falling behind in writing event information to the cache memory in timestamp order such that search queries with older timestamps are written before search queries with newer timestamps;
    when the one or more processors are falling behind in writing event information to the cache memory in timestamp order, writing the event information from the file to the cache memory by processing the event information of a most recent search query in the series of search queries before any other event information in the file; and
    receiving a request to lookup a particular primary key in the cache memory.

17. The medium of claim 16, wherein
    writing the event information includes first overwriting oldest event information associated with an oldest timestamp in the cache memory before overwriting other event information in the cache memory.

18. The medium of claim 17, wherein
    the method further comprises, when the oldest event information is to be overwritten, sending the oldest event information to long term storage.

19. The medium of claim 16, wherein the method further comprises:
    determining whether the particular key is included in the cache memory; and
    when the particular key is included in the cache memory, joining a secondary event corresponding to a user selecting an advertisement with the search query identified by the particular key.

20. The medium of claim 16, wherein the method further comprises:
    determining whether the particular key is included in the cache memory; and
    when the particular key is not included in the cache memory, determining whether the particular key is included in long term storage.

* * * * *